United States Patent
Lin

(10) Patent No.: US 9,223,409 B2
(45) Date of Patent: Dec. 29, 2015

(54) PORTABLE FUNCTION-EXPANDING DEVICE FOR ELECTRONIC DEVICE

(71) Applicant: NVIDIA Corporation, Santa Clara, CA (US)

(72) Inventor: Maojiang Lin, Shenzhen (CN)

(73) Assignee: NVIDIA Corporation, Santa Clara, CA (US)

(*) Notice: Subject to any disclaimer, the term of this patent is extended or adjusted under 35 U.S.C. 154(b) by 241 days.

(21) Appl. No.: 13/752,269

(22) Filed: Jan. 28, 2013

(65) Prior Publication Data
US 2014/0132517 A1 May 15, 2014

(30) Foreign Application Priority Data
Nov. 9, 2012 (CN) .......................... 2012 1 0448773

(51) Int. Cl.
*G06F 1/16* (2006.01)
*G06F 3/02* (2006.01)

(52) U.S. Cl.
CPC ............... *G06F 3/02* (2013.01); *G06F 1/1632* (2013.01)

(58) Field of Classification Search
CPC ............... H04L 2012/2841; H04L 2012/2849; H04L 65/1069; H04L 67/12; H04L 5/0037; H04L 63/06; H04L 63/18; H04L 67/14; H04L 67/18; H04L 67/42; H04L 29/06; H04L 63/0823; H04L 63/083; H04L 63/20; G06F 3/017; G06F 3/03547; G06F 1/1632; G06F 1/1643; G06F 1/1669; G06F 3/0425
USPC ............... 345/156, 168; 361/679.41
See application file for complete search history.

(56) References Cited

U.S. PATENT DOCUMENTS

| 6,493,220 | B1* | 12/2002 | Clark et al. ............... 361/679.41 |
| 7,050,041 | B1* | 5/2006 | Smith et al. .................. 345/156 |
| 7,362,567 | B1* | 4/2008 | Hsieh et al. ............. 361/679.41 |
| 2010/0295384 | A1* | 11/2010 | Kobayashi .................... 307/154 |
| 2011/0055747 | A1* | 3/2011 | Hua et al. ....................... 715/771 |
| 2013/0279109 | A1* | 10/2013 | Lindblad et al. ......... 361/679.43 |

FOREIGN PATENT DOCUMENTS

TW M422112 U 2/2012

OTHER PUBLICATIONS

Office Action from Taiwan Patent Application No. 102135704, dated Jun. 24, 2015.

* cited by examiner

*Primary Examiner* — Kent Chang
*Assistant Examiner* — Scott Au
(74) *Attorney, Agent, or Firm* — Zilka-Kotab, PC

(57) ABSTRACT

A portable function-expanding device for an electronic device is provided which comprises: a housing with a plurality of accommodating slots provided on an upper surface thereof for accommodating electronic devices respectively, wherein a function-expanding interface is provided in each of the accommodating slots for being connected with a function interface of the electronic device accommodated therein; and a function means located in the housing and connected with the function-expanding interface to fulfill the function-expanding of the corresponding electronic device. The portable function-expanding device for an electronic device fulfills the function-expanding of the corresponding electronic device conveniently. That is, the function-expanding is fulfilled conveniently as required by just inserting the electronic device into the corresponding accommodating slot and connecting the corresponding function-expanding interface in the accommodating with the function interface of the electronic device.

18 Claims, 1 Drawing Sheet

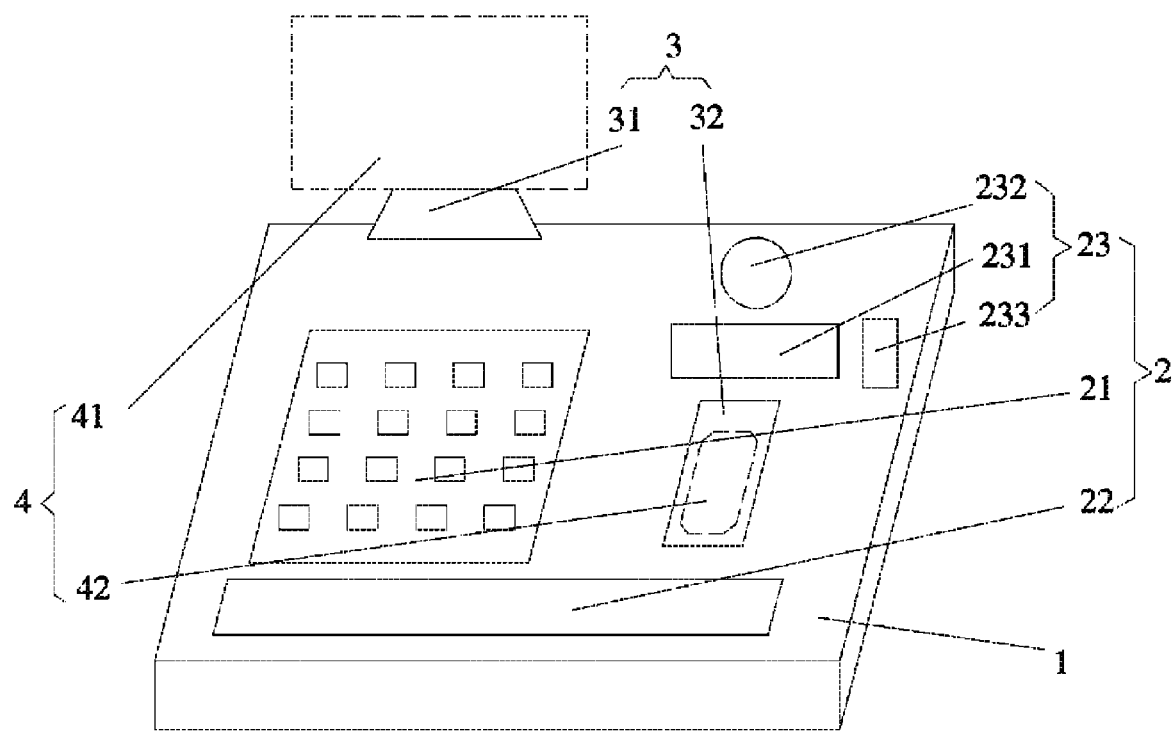

PORTABLE FUNCTION-EXPANDING DEVICE FOR ELECTRONIC DEVICE

CROSS-REFERENCE TO RELATED APPLICATIONS

This application claims priority to Chinese Patent Application No. 201210448773.7, filed on Nov. 9, 2012, which is hereby incorporated by reference in its entirety.

FIELD OF INVENTION

The present invention relates generally to the art of electronic devices, in particular, to a portable function-expanding device for an electronic device.

BACKGROUND

With the widespread applications of electronic devices, the desire for expanding functions of electronic devices anytime, anywhere and conveniently are increasing. For example, in business applications, a user might wish to expand a keyboard for a tablet and operate the tablet through the keyboard as needed, as well as charging a tablet or a mobile phone. As for a user such as a salesman, sometimes it desirable to expand a projecting means for electronic devices such as a tablet, a mobile phone, etc. to project the content therein to a screen.

Therefore, there is a need of providing a portable function-expanding device for an electronic device to solve the above problem in the prior art.

SUMMARY OF THE INVENTION

In order to solve the above problem, in accordance with one aspect of the present invention, a portable function-expanding device for an electronic device is provided which comprises: a housing with a plurality of accommodating slots provided on an upper surface thereof for accommodating electronic devices respectively, wherein a function-expanding interface is provided in each of the accommodating slots for being connected with a function interface of the electronic device accommodated therein; and a function means located in the housing and connected with the function-expanding interface to fulfill the function-expanding of the corresponding electronic device.

Preferably, a function means switch is provided on the housing, and the function means switch is connected to the function means for starting/ending the operation of the function means.

Preferably, a protecting cover is provided on each of the accommodating slots for covering the accommodating slot when the accommodating slot has no electronic device accommodated therein.

Preferably, the function-expanding interface comprises a keyboard function interface for being connected with a keyboard interface of the electronic device; the function means comprises a keyboard which includes a keyboard control circuit connected to the keyboard function interface for expanding a keyboard operating function of the corresponding electronic device.

Preferably, a keyboard-electronic device choosing button is provided on the housing for choosing a chosen electronic device to communicate with the keyboard.

Preferably, the function expanding interface comprises a power source function interface for being connected with a power source interface of the electronic device; the function means comprises a power source with a power output terminal of the power source being connected to the power source function interface for charging the corresponding electronic device.

Preferably, a power source-electronic device choosing button is provided on the housing for choosing a chosen electronic device to be charged by the power source.

Preferably, a power input interface is further provided on the housing, and the power input interface is connected with a power input terminal of the power source for charging the power source.

Preferably, a power display of the power source is further provided on the housing for displaying the amount of electric energy of the power source.

Preferably, a power alarm of the power source is further provided on the housing for raising an alarm when the amount of electric energy of the power source is lower than a predetermined value.

Preferably, the function means comprises a keyboard and a power source, and the keyboard includes a keyboard control circuit; the function expanding interface comprises a power source-keyboard shared function interface for being connected with a power source-keyboard shared interface of the electronic device; the power source-keyboard shared function interface is connected with both of the keyboard control circuit and a power output terminal of the power source for expanding a keyboard operating function of the corresponding electronic device while charging the corresponding electronic device.

Preferably, the power source-keyboard shared function interface is a USB interface.

Preferably, the function-expanding interface comprises a video input interface for being connected with a video output interface of the corresponding electronic device; the function means comprises a projecting means, which includes: a light source; an electro-optical converting module connected with the video input interface for converting light from the light source into a light signal corresponding to an electronic signal from the video input interface; and a portable light amplifier connected with the electro-optical converting module for receiving, amplifying and outputting the light signal.

Preferably, the video input interface is a High Definition Multimedia Interface.

Preferably, the projecting means further includes a projecting lens for projecting outward the light amplified and output by the portable light amplifier.

Preferably, the function device further comprises a keyboard and a power source, and the keyboard includes a keyboard control circuit; the function expanding interface comprises a power source-keyboard shared function interface for being connected with a power source-keyboard shared interface of the electronic device; the power source-keyboard shared function interface is connected with both of the keyboard control circuit and a power output terminal of the power source for expanding a keyboard operating function of the corresponding electronic device while charging the corresponding electronic device.

Preferably, the function expanding interface comprises a mouse function interface for being connected with a mouse interface of the electronic device; the function means comprises a mouse connected to the mouse function interface by a mouse cable for expanding a mouse operating function of the corresponding electronic device.

Preferably, a mouse cable winding means is further provide on the housing for unwinding the mouse cable while the mouse is in use and winding the mouse cable while the mouse is not in use.

Preferably, the function expanding interface comprises a touchpad function interface for being connected with a touchpad interface of the electronic device; the function means comprises a touchpad connected to the touchpad function interface for expanding a touch operating function of the corresponding electronic device.

Following are the effectiveness of the present invention:

In the housing of the portable function-expanding device for an electronic device of the present invention, the plurality of accommodating slots can accommodate electronic devices for which function-expanding is required, such as a tablet for which a keyboard might be required in operating, a mobile phone for which a charging is required etc., respectively. The function means in the housing is connected with the function-expanding interface in the accommodating slot, and the function-expanding interface is connected with the function interface of the electronic device (for example, the keyboard function interface in the accommodating slot is connected with the keyboard interface of a tablet), such that the function means is connected with the function interface of the electronic device, and the function-expanding of the corresponding electronic device is fulfilled conveniently. That is, the function-expanding is fulfilled conveniently as required by just inserting the electronic device into the corresponding accommodating slot and connecting the corresponding function-expanding interface in the accommodating with the function interface of the electronic device.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The following drawing of the present invention as a part of the present invention herein is used for understanding of the present invention, the embodiments and the descriptions thereof are illustrated in the drawing for explaining the principle of the present invention. In the drawing.

FIG. 1 is a schematic view of the portable function-expanding device for an electronic device according to an embodiment of the invention.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

As shown in FIG. 1, a portable function-expanding device for an electronic device in accordance with an embodiment of the present invention comprises a housing 1 and a function means 2 which could include e.g. a keyboard, a power source etc. The function means 2 of the present embodiment includes a keyboard, a power source and a projecting means which will be described in detail hereinafter. As shown in FIG. 1, the function means 2 is located in the housing 1. Moreover, two accommodating slots 3 are provided on an upper surface of the housing 1 for accommodating a tablet and a mobile phone respectively. Of course, in practice, more accommodating slots 3 for accommodating more electronic devices 4 which could be of more types. Wherein, a function-expanding interface (not shown) is provided in the each of the accommodating slots 3 for being connected with a function interface of the electronic device accommodating therein. Also, the function means 2 is connected with the function-expanding interface to fulfill the function-expanding of the corresponding electronic device 4.

It will be understand that in this portable function-expanding device for a electronic device, a plurality of accommodating slots 3 can accommodate the electronic device 4 for which function-expanding is required, such as a tablet for which a keyboard might be required in operating, a mobile phone for which a charging is required etc., respectively. The function means 2 in the housing 1 is connected with the function expanding interface in the accommodating slot 3, and the function expanding interface is connected with the function interface of the electronic device 4 (for example, the keyboard function interface in the accommodating slot 3 is connected with the keyboard interface of a tablet), such that the function means 2 is connected with the function interface of the electronic device 4 and the function-expanding of the corresponding electronic device 4 is fulfilled conveniently. That is, the function-expanding is fulfilled conveniently by just inserting the electronic device 4 into the corresponding accommodating slot 3 and connecting the corresponding function expanding interface in the accommodating slot 3 with the function interface of the electronic device 4.

It should be noted that the above mentioned "accommodating" of the electronic device 4 by the accommodating slot 3 comprises not only the case in which the electronic device is accommodated entirely but also the case in which just a part of the electronic device is accommodated. That depends on the dimensions and the properties of the electronic device.

Simply, the function means 2 is connected with the corresponding electronic device 4 on the aspect of hardware when the function-expanding interface connected with the function means 2 is connected with the electronic device 4, and the function means 2 may be set to turn to an operating state once it is connected with the corresponding electronic device 4. However, preferably, in the present embodiment, a function means switch (not shown) may be further provided on the housing 1, and the function means switch is connected to the function means 2 for starting/ending the operation of the function means 2. Thereby, the user can start/end the function means 2 at any time as needed. Furthermore, preferably, the function-expanding interface may be provided at such a position that the function-expanding interface can be connected with the corresponding function interface of the corresponding electronic device 4 once the corresponding electronic device 4 insert into the corresponding accommodating slot 3.

The accommodating slot 3 can be exposed to outside. However, preferably, in the present embodiment, a protecting cover (not shown) is provided on each of the accommodating slots 3 for covering the accommodating slot 3 when the accommodating slot 3 has no electronic device accommodated therein, so as to keep off dust and act as a guard.

The function means 2 and the corresponding function-expanding interface can be of a plurality of types depending on the function which is required to be expanded. Preferably, in the present embodiment, the function-expanding interface comprises a keyboard function interface (not shown) for being connected with a keyboard interface (not shown) of the tablet 41. Correspondingly, as shown in FIG. 1, the function means 2 comprises a keyboard 21 which includes a keyboard control circuit (not shown) connected to the keyboard function interface for expanding a keyboard operating function of the tablet 41. If a user feels that it is not convenient to operate a tablet by touching directly and wishes to operate the tablet by a keyboard, he/she can insert the corresponding part of the tablet 41 into the tablet accommodating slot 31 of the plurality of accommodating slots 3 and connect the keyboard interface of the tablet 41 with the keyboard function interface in the housing 1, such that the keyboard 21 is connected to the tablet 41 which in turn can be operated through the keyboard 21.

In the present embodiment, the keyboard 21 is used to be connected with the tablet. Of course, the keyboard 21 can also be provided to be able to be connected with other electronic devices 4. For example, in the present embodiment, the keyboard 21 is further used to be connected with the mobile phone 42 (when the mobile phone 42 has a keyboard interface). In this case, the corresponding mobile phone accommodating slot 32 of the accommodating slot 3 is provided with a keyboard function interface which is connected with the keyboard control circuit of the keyboard 21. Thereby, the mobile phone 42 can be operated through the keyboard 21 when the mobile phone 42 is inserted into the mobile phone accommodating slot 32, with the keyboard interface of the mobile phone 42 connected with the keyboard function interface in the mobile phone accommodating slot 32.

In addition, preferably, in the present embodiment, a keyboard-electronic device choosing button (not shown) is provided on the housing 1 for choosing a chosen electronic device 4 (the tablet 41 or the mobile phone 42) to communicate with the keyboard 21.

In addition, preferably, the function expanding interface comprises a power source function interface (not shown) for being connected with a power source interface (not shown) of the electronic device 4. Correspondingly, as shown in FIG. 1, the function means 2 comprises a power source 22 with a power output terminal (not shown) of the power source 22 being connected to the above mentioned power source function interface for charging the electronic device 4. The electronic device 4 can be charged through the power source 22 as required by inserting the corresponding part of the electronic device 4 into the corresponding accommodating slot 3 and connecting the power source interface thereof with the power source function interface in the accommodating slot (such that the power source 22 is connected with the electronic device 4). In the present embodiment, the electronic device 4 comprises a tablet 41 and a mobile phone 42, so correspondingly, the tablet accommodating slot 31 and the mobile phone accommodating slot 32 are provided with a power source function interface respectively, with both of the power source function interfaces connected to the power sources 22. Of course, in practice, the power source 22 can also charge other electronic devices 4 through the power source function interface in other accommodating slots 3.

In addition, preferably, in the present embodiment, a power source-electronic device choosing button not shown) is provided on the housing 1 for choosing a chosen electronic device 4 to be charged by the power source 22. For example, when the tablet 41 and the mobile phone 42 are both inserted in the housing 1, the user can control the power source 22 to charge the mobile phone 42 only by operating the power source-electronic device choosing button.

More preferably, in the present embodiment, a power input interface (not shown) is further provided on the housing 1, and the power input interface is connected with a power input terminal (not shown) of the power source 22 for charging the power source 22.

And more preferably, in the present embodiment, a power display of the power source (not shown) is further provided on the housing 1, and the power display of the power source is connected to the power source 22 for displaying the amount of electric energy of the power source 22. Thereby, the user can determine whether it is required to charge the power source 22 in accordance with the content showed on the power display.

In addition, more preferably, in the present embodiment, a power alarm of the power source (not shown) is further provided on the housing 1 for raising an alarm when the amount of electric energy of the power source is lower than a predetermined value (for example, a sound alarm or a light alarm), thereby warning the user intelligently to charge the power source 22 when the amount of electric energy of the power source 22 is not enough.

The power source function interface and the keyboard function interface mentioned above can be formed as a shared function interface when the power source interface and the keyboard interface of the electronic device are formed as a shared interface. Specifically, in the second embodiment of the present invention, the function means comprises a keyboard and a power source, and the keyboard includes a keyboard control circuit. Correspondingly, the function-expanding interface comprises a power source-keyboard shared function interface for being connected with a power source-keyboard shared interface of the electronic device. The power source-keyboard shared function interface is connected with both of the keyboard control circuit and the power output terminal of the power source for expanding the keyboard operating function of the corresponding electronic device while charging the corresponding electronic device. Thereby, the electronic device can be operated through the keyboard while can be charged conveniently by just inserting the corresponding electronic device into the corresponding accommodating slot 3 and connecting the power source-keyboard shared function interface in the accommodating slot 3 with the power source-keyboard shared interface of the electronic device.

Preferably, in the second embodiment, the power source-keyboard shared function interface is a USB interface. It will be understand that the power source-keyboard function interface of the corresponding electronic device is also a USB interface.

Turn back to the first embodiment in accordance with the present invention, preferably, in the present embodiment, the function-expanding interface further comprises a video input interface for being connected with a video output interface of the corresponding electronic device 4. Correspondingly, the function means 2 comprises a projecting means 23, which includes alight source 233, an electro-optical converting module 231 and a portable light amplifier 232. Wherein, the electro-optical converting module 231 is connected with the video input interface for converting light from the light source 233 into a light signal corresponding to an electronic signal from the video input interface. The portable light amplifier 232 is connected with the electro-optical converting module 231 for receiving, amplifying and outputting the light signal from the electro-optical converting module 231. The light source can be charged by the power source 22 mentioned above.

If a user needs to project out the content in the electronic device 4, he/she can insert the corresponding part of the electronic device 4 into the corresponding accommodating slot 3 and connect the video output interface of the electronic device 4 with the video input interface mentioned above, such that the projecting means 23 is connected to the electronic device 4, and the content in the electronic device 4 can be projected. In the present embodiment, the tablet accommodating slot 31 and the mobile phone accommodating 32 can be provided with video input interfaces respectively, with both of the video input interfaces connected to the electro-optical converting module 231 of the projecting means 23 for being connected with the video input interfaces of the tablet 41 and the mobile phone 42 respectively. Thereby, the projecting of the content in the tablet 41 and the mobile phone 42 is fulfilled.

The above mentioned video input interface can be of any suitable types. Preferably, the video input interface is a High Definition Multimedia Interface in the present embodiment.

In addition, preferably, in the present embodiment, the projecting means further comprises a projecting lens for projecting outward the light amplified and output by the portable light amplifier.

Furthermore, as mentioned above, the function means 2 and the corresponding function-expanding interface can further comprise many other types depending on the function which is required to be expanded. For example, preferably, in the present embodiment, the function-expanding interface comprises a mouse function interface for being connected with the mouse interface of the electronic device 4. Correspondingly, the function means 2 comprises a mouse (not shown) connected to the mouse function interface by a mouse cable for expanding a mouse operating function of the corresponding electronic device. Taking the tablet 41 as an example, if a user feels that it is not convenient to operate a tablet by touching directly and wishes to operate the tablet by a mouse, he/she can insert the corresponding part of the tablet 41 into the tablet accommodating slot 31 of the plurality of accommodating slots 3 and connect the mouse interface of the tablet 41 with the mouse function interface in the housing 1 such that the mouse is connected to the tablet 41 which in turn can be operated by the mouse.

More preferably, in the present embodiment, a mouse cable winding means (not shown) is further provided on the housing 1 for unwinding the mouse cable while the mouse is in use and winding the mouse cable while the mouse is not in use. The mouse cable winding means can comprise a reel and a motor, with the mouse cable wound around the reel and an output shaft of the motor connected to the reel to drive the reel to wind/unwind the mouse cable. Thus the mouse can be wound when not in use, such that the compactness and the portability of the whole portable function-expanding device is maintained.

Similarly, the function-expanding interface comprises a touchpad function interface for being connected with a touchpad interface of the electronic device 4. Correspondingly, the function means 2 comprises a touchpad (not shown) connected to the touchpad function interface for expanding a touch operating function of the corresponding electronic device. The function of this touchpad is the same as the touchpad of a notebook computer.

It should be noted that the terms when used in the singular can have the dual meaning of a single part or a plurality of parts.

The present invention has been described by the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

What is claimed is:

1. A portable function-expanding device for an electronic device, comprising:
a housing with a plurality of accommodating slots provided on an upper surface thereof for accommodating electronic devices respectively, wherein a function-expanding interface is provided in each of the accommodating slots for being connected with a function interface of the electronic device accommodated therein; and
a function means located in the housing and connected with at least one function-expanding interface to fulfill the function-expanding of the corresponding electronic device,
wherein the function-expanding interface provided in at least one accommodating slot of the housing comprises a video input interface for being connected with a video output interface of the corresponding electronic device; and
the function means comprises a projecting means, which includes:
a light source;
an electro-optical converting module connected with the video input interface for converting light from the light source into a light signal corresponding to an electronic signal from the video input interface; and
a portable light amplifier connected with the electro-optical converting module for receiving, amplifying and outputting the light signal.

2. The portable function-expanding device according to claim 1, wherein a function means switch is provided on the housing, and the function means switch is connected to the function means for starting/ending the operation of the function means.

3. The portable function-expanding device according to claim 1, wherein a protecting cover is provided on each of the accommodating slots for covering the accommodating slot when the accommodating slot has no electronic device accommodated therein.

4. The portable function-expanding device according to claim 1, wherein:
the function-expanding interface provided in at least one accommodating slot of the housing comprises a keyboard function interface for being connected with a keyboard interface of the electronic device; and
the function means comprises a keyboard which includes a keyboard control circuit connected to the keyboard function interface for expanding a keyboard operating function of the corresponding electronic device.

5. The portable function-expanding device according to claim 4, wherein a keyboard-electronic device choosing button is provided on the housing for choosing a chosen electronic device to communicate with the keyboard.

6. The portable function-expanding device according to claim 1, wherein:
the function expanding interface provided in at least one accommodating slot of the housing comprises a power source function interface for being connected with a power source interface of the electronic device; and
the function means comprises a power source with a power output terminal of the power source being connected to the power source function interface for charging the corresponding electronic device.

7. The portable function-expanding device according to claim 6, wherein a power source-electronic device choosing button is provided on the housing for choosing a chosen electronic device to be charged by the power source.

8. The portable function-expanding device according to claim 6, wherein a power input interface is further provided on the housing, and the power input interface is connected with a power input terminal of the power source for charging the power source.

9. The portable function-expanding device according to claim 6, wherein a power display of the power source is further provided on the housing for displaying the amount of electric energy of the power source.

10. The portable function-expanding device according to claim 6, wherein a power alarm of the power source is further provided on the housing for raising an alarm when the amount of electric energy of the power source is lower than a predetermined value.

11. The portable function-expanding device according to claim 1, wherein:
    the function means comprises a keyboard and a power source, and the keyboard includes a keyboard control circuit;
    the function expanding interface provided in at least one accommodating slot of the housing comprises a power source-keyboard shared function interface for being connected with a power source-keyboard shared interface of the electronic device; and
    the power source-keyboard shared function interface is connected with both of the keyboard control circuit and a power output terminal of the power source for expanding a keyboard operating function of the corresponding electronic device while charging the corresponding electronic device.

12. The portable function-expanding device according to claim 11, wherein the power source-keyboard shared function interface is a USB interface.

13. The portable function-expanding device according to claim 1, wherein the video input interface is a High Definition Multimedia Interface.

14. The portable function-expanding device according to claim 1, wherein the projecting means further includes a projecting lens for projecting outward the light amplified and output by the portable light amplifier.

15. The portable function-expanding device according to claim 1, wherein:
    the function device further comprises a keyboard and a power source, and the keyboard includes a keyboard control circuit;
    the function expanding interface provided in at least one accommodating slot of the housing comprises a power source-keyboard shared function interface for being connected with a power source-keyboard shared interface of the electronic device; and
    the power source-keyboard shared function interface is connected with both of the keyboard control circuit and a power output terminal of the power source for expanding a keyboard operating function of the corresponding electronic device while charging the corresponding electronic device.

16. The portable function-expanding device according to claim 1, wherein:
    the function expanding interface provided in at least one accommodating slot of the housing comprises a mouse function interface for being connected with a mouse interface of the electronic device; and
    the function means comprises a mouse connected to the mouse function interface by a mouse cable for expanding a mouse operating function of the corresponding electronic device.

17. The portable function-expanding device according to claim 16, wherein a mouse cable winding means is further provide on the housing for unwinding the mouse cable while the mouse is in use and winding the mouse cable while the mouse is not in use.

18. The portable function-expanding device according to claim 1, wherein:
    the function expanding interface provided in at least one accommodating slot of the housing comprises a touchpad function interface for being connected with a touchpad interface of the electronic device; and
    the function means comprises a touchpad connected to the touchpad function interface for expanding a touch operating function of the corresponding electronic device.

\* \* \* \* \*